C. I. GESELL.
RUST PREVENTION.
APPLICATION FILED JAN. 7, 1918.
1,269,926.
Patented June 18, 1918.
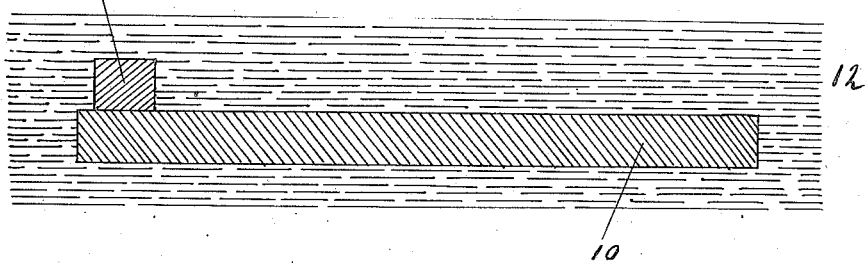
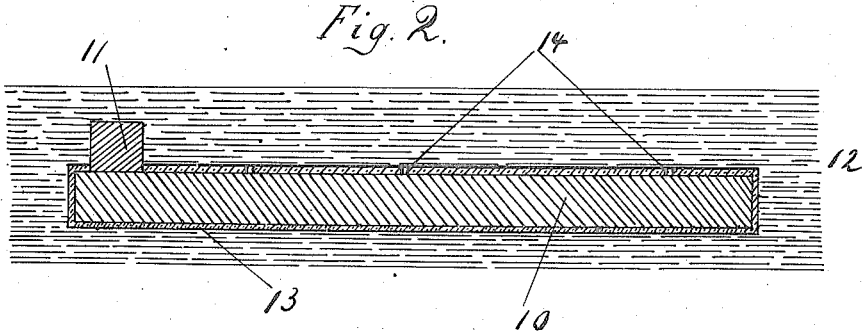
INVENTOR

UNITED STATES PATENT OFFICE.

CARLOS IDAHO GESELL, OF MAMARONECK, NEW YORK.

RUST PREVENTION.

1,269,926.   Specification of Letters Patent.   Patented June 18, 1918.

Application filed January 7, 1918.   Serial No. 210,712.

*To all whom it may concern:*

Be it known that I, CARLOS IDAHO GESELL, a citizen of the Argentine Republic, and resident of Mamaroneck, in the county of Westchester and State of New York, have invented certain new and useful Improvements in Rust Prevention, of which the following is a specification.

The present invention relates to an improved method for preventing the rusting of iron or steel objects, like ships, piers, condensers, etc., contacting with river, sea or the like water. It utilizes to this effect the protective agent which an electro-positive metal to iron creates under certain conditions on the said iron or steel object by means of a galvanic current. Another object of the present invention is to prepare the iron or steel parts in such a way that only a very slight galvanic current will be required to prevent them from rusting.

With these and other objects in view, my invention is shown in the accompanying drawings, and will hereinafter be more fully described with reference thereto, and finally be pointed out in the claims.

In the accompanying drawings:

Figure 1 illustrates an iron sheet 10 which is in metallic contact with a mass of zinc 11, both metals being submerged in an aqueous saline solution 12.

Fig. 2 is an identical view where the iron 10 is coated with a layer of paint 13, provided with pores or fissures 14.

In carrying out my invention, I make use of the phenomena of electrolysis which generates when two different metals are in contact with each other and submerged in a saline solution, and which creates a protective agent on the electro-negative metal, while the electro-positive metal is eaten away. I have found by experiment that when iron is in metallic contact with zinc, both submerged in the ocean, the iron does not rust, while the zinc is slowly consumed. An identical phenomenom occurs when the zinc is replaced by any other metal which is electro-positive to iron and is enabled to create a galvanic current. The rate of consumption of the electro-positive metal is proportional to the rate with which the water absorbs the protective agent on the electro-negative metal. The rate of this absorption varies with the quality of the water and is more rapid when the water is in motion than when it is quiet.

I explain the rusting of a painted iron plate submerged in water by the theory that the paints at present in use are not absolutely waterproof, thus giving opportunity for minute particles of water to pass through minute pores or fissures and act upon the metal, causing it to rust. Little animals which eat the paint away may also contribute to the rusting of an iron plate. When the first little spots have begun to rust, they spread out under the paint and peel it off.

If such a painted iron plate is in metallic contact with a mass of zinc, both contacting with a saline water solution, a rusting will be prevented on the well paint covered parts by the action of the paint, and on the uncovered parts by the action of the zinc. As thus the rusting process cannot take a start, the paint is prevented from peeling off, and the consumption of zinc is slow because its electrolytic action is confined only to the minute uncovered spots.

I am aware that coating of iron objects with zinc has been used heretofore for rust prevention, but I believe to have suggested first the method of preventing the rusting of painted iron objects submerged in an aqueous salt solution by putting them into metallic contact with an isolated piece of metal which is electro-positive to iron and is also submerged in the said solution. This not only enables one to replace the electro-positive metal as often as necessary, but it enables also the painting of the electro-negative metal in the way outlined. Such a painting is not expedient with galvanized or otherwise zinc coated objects, as it is well known that zinc coated and painted iron objects submerged in an electrolyte like fresh or salt water do not last as long as identical objects deprived from the coating of paint. I attribute this to the coating of paint on the zinc which prevents the electrolytic action thereof.

This invention applies to iron or steel objects submerged in a vessel of reduced capacity, as well as to those submerged in a large expanse of water and also to those objects submerged in moist earth or the like. When referring to iron in the claims, I include as well those alloys which are made chiefly of iron, as for instance cast iron, steel, nickel-steel, etc.

I have illustrated and described preferred and satisfactory forms of my invention, but it is obvious that changes may be made therein within the spirit and scope thereof as defined in the appended claims.

I claim:

1. The method of preventing the corrosion of a metal consisting in the combination of covering it with a non-metallic coating of paint and making it the negative electrode of a voltaic cell, the said coating of paint giving access to the said metal of a limited amount of electrolyte.

2. A method of rust prevention consisting in holding in metallic contact with each other a body of iron covered with a non-metallic paint having holes or fissures in it and an unpainted different metallic body in an electrolyte.

3. A method of rust prevention consisting in holding in metallic contact with each other a body of iron covered with a non-metallic paint having holes or fissures in it and an unpainted different metallic body in sea water.

4. A method of rust prevention consisting in holding in metallic contact with each other a body of iron covered with a non-metallic paint having holes or fissures in it and an unpainted body of zinc in an electrolyte.

5. A method of rust prevention consisting in holding in metallic contact with each other a body of iron covered with a non-metallic paint having holes or fissures in it and an unpainted body of zinc in sea water.

Signed at Mamaroneck, in the county of Westchester and State of New York, this fourth day of January, A. D. 1918.

CARLOS IDAHO GESELL.

Witnesses:
   JOHN F. KREWET,
   JOHN W. BLOWER.